April 28, 1959     W. E. SWIFT, JR     2,884,536
RADIO-ACTIVE GAUGING CHARACTERIZATION DEVICE
Filed Jan. 26, 1956     2 Sheets-Sheet 1
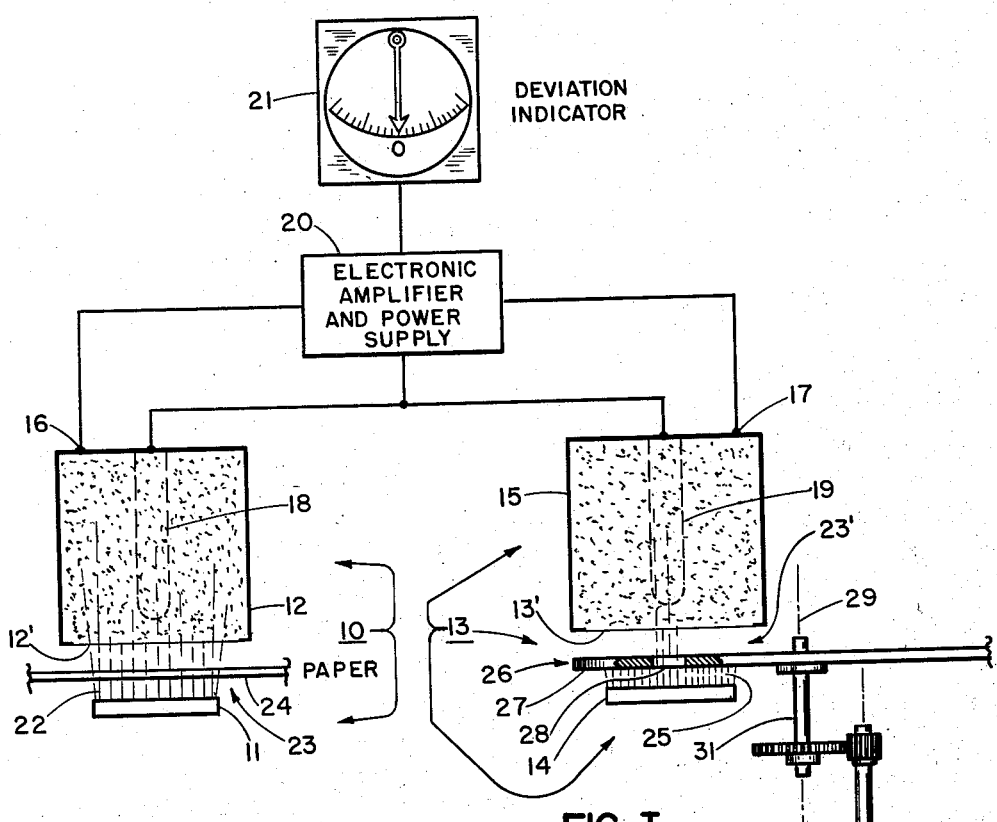
FIG. I
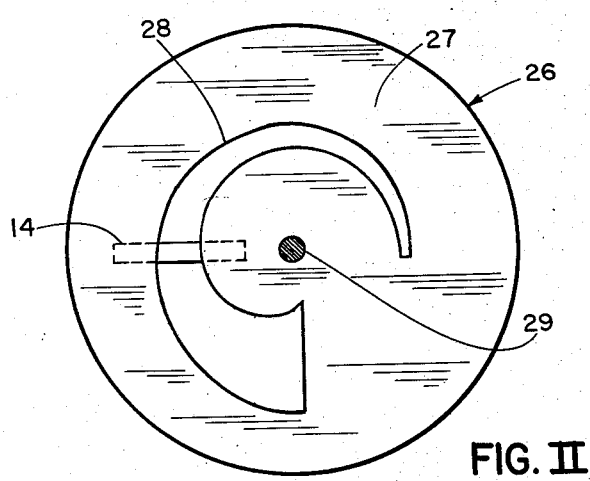
FIG. II
INVENTOR.
WILLARD EVERETT SWIFT, JR.
BY Lawrence H. Poehler
AGENT April 28, 1959 W. E. SWIFT, JR 2,884,536
RADIO-ACTIVE GAUGING CHARACTERIZATION DEVICE
Filed Jan. 26, 1956 2 Sheets-Sheet 2
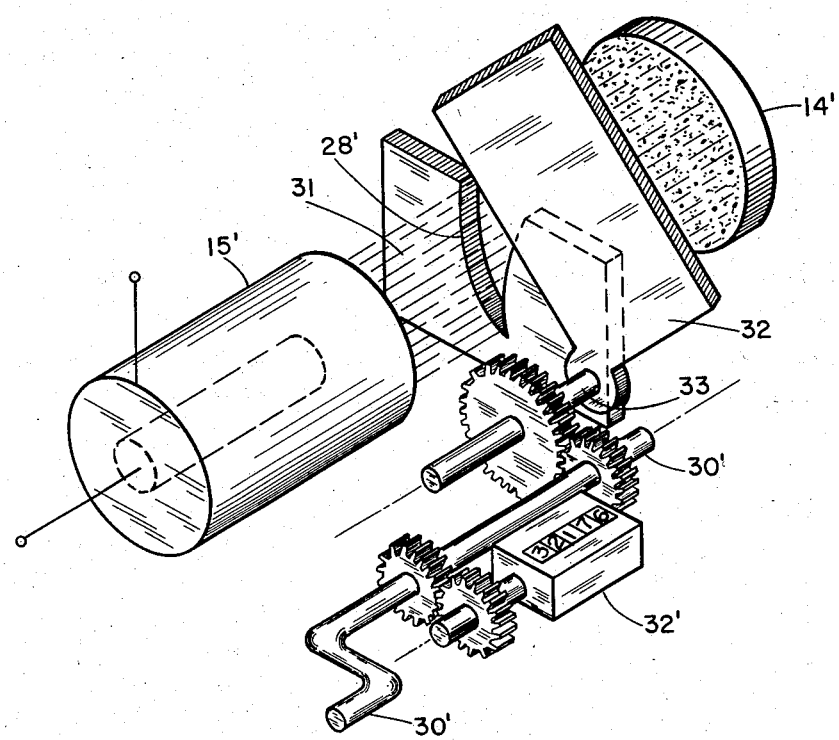
FIG. III
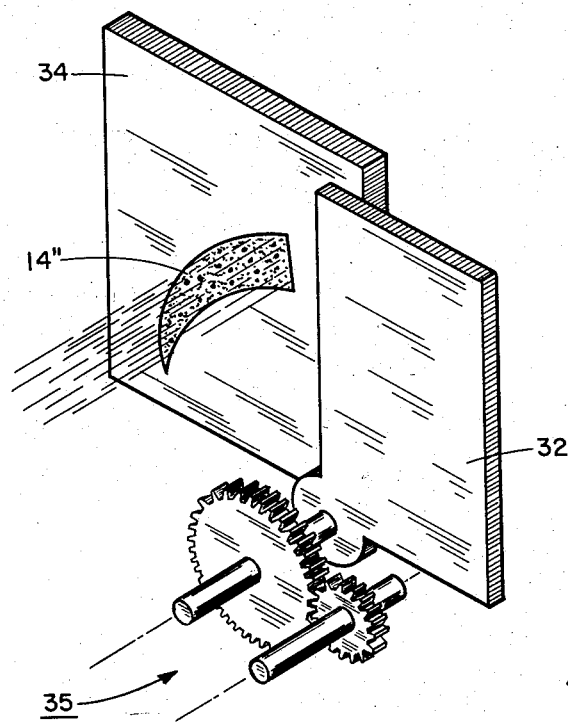
FIG. IV
INVENTOR.
WILLARD EVERETT SWIFT, JR
BY
Lawrence H. Poston
AGENT United States Patent Office 2,884,536
Patented Apr. 28, 1959

2,884,536

RADIO-ACTIVE GAUGING CHARACTERIZATION DEVICE

Willard Everett Swift, Jr., Sharon, Mass., assignor to The Foxboro Company, Foxboro, Mass., a corporation of Massachusetts Application January 26, 1956, Serial No. 561,511

1 Claim. (Cl. 250—83.6)

This invention relates to gauging systems using a radiation source of the radio-active isotope class, and has particular reference to such a system with characterization means for producing a gauging measurement of a particular nature.

The device of this invention is based on a gauging system wherein radiations from a radio-active source, such as a body of thallium 204 or strontium 90, pass through a suitable gap, such as an air gap, to an ionization chamber, with the material under test being placed in the air gap. The chamber is polarized and contains air or other suitable gas, for example, argon or a mixture of argon and nitrogen. The gas in the chamber is ionized by the radiations which pass through the material under test and enter the chamber. Thus the degree of ionization of the chamber, and consequently the electrical current through the chamber polarization arrangement, are functions of the radiation absorption factor of the material under test.

In such an arrangement, the ionization factor in the ionization chamber is linear with respect to linear changes in the radiations reaching the ionization chamber. However, as an example of a condition with which this invention is concerned, when a gauging measurement is effected by interposing a body under test between the gauging source and the ionization chamber, successive equal changes in the measured variant of the body under test do not result in successive equal changes of the degree of ionization. Each equal unit of increment or decrement of the measured variant of the body under test changes the total of the radiations reaching the ionization chamber by a percentage factor. This percentage factor may remain essentially the same, or it may vary slightly in the direction of the increment or decrement as the case may be. At any rate, it is based on a different total remaining radiation for each successive step. That is, the first unit change in the measured variant might stop 10% of 100% of the radiations. The next unit change in the same direction might again stop 10%, but this is 10% of the remaining 90% of the total radiations. Since the ionization factor follows directly with radiation application to the ionization chamber, the ionization of the gas in the ionization chamber is not linear with respect to successive equal changes in the measured variant of the body under test.

This invention, therefore, is directed to means for varying the characterization of measurements in a radio-active gauging system and, as an illustrative example, is directed to means for linearizing such measurements.

It is an object of this invention to provide a new radio-active gauging system.

Other objects and advantages of this invention will be in part apparent and in part pointed out hereinafter.

In the drawings:

Figure I is a schematic showing of a radio-active gauging system embodying an illustration of this invention;

Figure II is a plan view of the characterization disc in the structure of Figure I;

Figure III is a perspective view of an alternate structure gauging system, shown in part, with respect to the system of Figure I; and Figure IV is a perspective view of an alternate structure with respect to a portion of the structure of Figure III.

The radio-active gauging system as shown in Figure I has therein a measuring combination 10, comprising a radio-active source 11 and an ionization chamber 12, and a reference combination 13 comprising a radio-active source 14 and an ionization chamber 15. The ionization chambers 12 and 13 respectively have windows 12' and 13' therein which are permeable to radio-active isotope radiations, for example, to beta rays. Each of the chambers 12 and 13 is also charged with a body of ionizable gas such as argon, or a mixture of argon and nitrogen, and each is further provided with a polarizing electrode as at 16 and 17 and with a collector electrode as at 18 and 19. The polarizing electrodes 16 and 17 are energized from, and the outputs of the collector electrodes are electrically bucked against each other and the result of this bucking is applied to, a combination electronic power supply and amplifier unit 20. The combined output of the collector electrodes 18 and 19 as amplified by the unit 20, is applied to an electrical deviation indicator 21. The calibration of the indicator 21 is to zero at center scale, and deviations occur in one direction or the other therefrom, according to the direction of change in the measured variable.

In the measuring combination 10, the radio-active source 11 is in solid form, for example, as strontium 90. The radiations therefrom are beta rays 22 which are directed to the measuring ionization chamber 12 through an air gap 23, and through a material under test, such as a strip of paper 24 located in the air gap 23.

In the reference combination 13, the radio-active source 14 is also in solid form such as strontium 90, emitting beta rays 25. This reference combination is provided with an air gap 23' through which the beta rays 25 are directed to the reference ionization chamber 15, with a characterization member 26 in the air gap and thus interposed between the source 14 and the chamber 15.

As mentioned hereinbefore, the degree of ionization produced in the gas in the measurement chamber 12 in response to beta rays applied thereto from the source 11 and through the paper 24, is not linear with respect to changes in the measured variable in the paper 24. Thus the progression of degree of ionization is according to a particular characterization, determined by the beta ray absorption characteristic of the measured variable. This measured variable may be basis weight in paper, that is, the weight per unit area of the combination of paper fiber and water. The difference in the beta ray absorption characteristics of paper fiber and water is negligible for practical purposes with respect to the device of this invention.

Referring again to Figure I and the characterization member 26, this member is in the form of a rotatable disc 27 (see also Figure II) with an exponentially characterized slot 28 formed therein. The slot 28 extends through the disc 27 in curved form about the center 29 of the disc. The slot 28 varies in width according to the particular characterization required, and in the instance shown it is curved and tapered somewhat like a longitudinal central section through a ram's horn, imagined in a single flat plane. The beta ray source 14, as shown in Figure II, is rectangular, with its longitudinal axis arranged essentially in line with a radius of the characterization disc. The disc 27 and the source 14 are so mutually arranged as to expose different lengths of the source 14 through the disc slot 28 as the disc 27 is rotated about its axis 29. Thus beta rays may be applied to the reference chamber 15 to ionize the gas therein to degrees essentially equal to the degrees of ionization of the gas in the measuring chamber 12.

In the operation of this device, a variation of the measured variable first changes the ionization of the measuring chamber 12 and consequently unbalances the deviation indicator 21. Then the reference system characterization disc 27 is rotated to vary the reference ionization until the deviation indication is again at zero, and the amount of this rotation of the disc 27 is available as a representation of the change in the measured variable. The outputs of the ionization chambers are electronically opposed by suitable conventional means in the amplifier unit 20. When the output of the chamber 12 is increased by a change in the measured variable, the reference chamber output is increased to match and this reference increase is measured in terms of the rotation of the reference disc. In the embodiment of this invention illustrated herein, the disc rotation is produced through a hand crank 30 which is suitably geared to a center shaft 31 on which the characterized disc 27 is mounted. The disc rotation is measured by a counter 32 which is also suitably geared to the hand crank 30. Thus the counter 32 may be arranged to linearly represent changes in a measured variable, such as the basis weight of paper.

Figure III illustrates an alternate form of reference chamber arrangement, comprising an ionization chamber 15' comparable to the reference chamber 15 of Figure I, with a beta ray source 14' from which beta rays enter the chamber 15'. A fixed interception plate 31 is located between the source 14' and the chamber 15' and is provided with a characterized slot 28' comparable in form and function to the Figure II characterized slot 28. Thus the only beta rays to reach the ionization chamber 15' are those which pass through the slot 28', the remainder being blocked off by the fixed interception plate 31. The degree of exposure of the beta ray source 14' through the slot 28' is variable by means of a movable interception plate 32 which is solid and movable transversely between the fixed interception plate 31 and the source 14' to vary the area of the slot 28' which is open to the passage of the beta rays. The configuration of the slot 28' and the manner of open area variation thereof by the movable interceptor plate 32 are combined to provide the predetermined desired characterization of the ionization of the gas in the reference chamber 15'.

Further in Figure III, the movable interceptor plate 32 is pivotally mounted, for its movement of interception, on a shaft 33 which is rotatable through suitable gearing by a hand crank 30', with a counter 32' also suitably geared to the hand crank 30' to indicate the amount of movement of the movable interceptor plate 32 required to balance out the system in compensation for a change in the measured variable.

Figure IV illustrates another alternate structure arrangement, which may be substituted for a portion of the structure of Figures I or III. In the Figure IV structure, the beta ray reference itself (14") is formed in a characterized curved shape and mounted on a fixed backing plate 34. A movable interceptor plate 32' is mounted for movement across the face of the characterized form source 14" to vary the beta rays available therefrom for application to a reference ionization chamber such as that at 15' in Figure III. Gearing, shafting, and counter arrangements for the Figure IV structure duplicate those of Figure III and are suggested in Figure IV by the partial showing 35.

This invention, therefore, provides a new and improved radio-active gauging source device wherein characterization is applied to the gauging measurement.

As many embodiments may be made of the above invention and as changes may be made in the embodiments set forth above without departing from the scope of the invention, it is to be understood that all matter hereinbefore set forth or shown in the accompanying drawings is to be interpreted as illustrative only and not in a limiting sense.

I claim:

A system for measurement of the basis weight of paper wherein radiations from a beta radiation source are passed through an air gap to an ionization chamber and the paper to be measured is passed between said source and said chamber, said system comprising a measuring combination of a first source of continuous beta radiations and a first, gas filled, ionization chamber, separated by a measurement air gap whereby application of said radiations to said gas directly produces electrical effects of ionization of said gas in said chamber and whereby basis weight variations of paper in said air gap results in non-linear variations of said ionization, said air gap being empty of other interrupters whereby said ionization is operationally variable only by variations in said paper, a compensation combination of a second source of continuous beta radiations and a second, gas filled, ionization chamber separated by a compensation air gap, and a flat, uniform thickness rotatable disc in said compensation air gap, said disc having a "rams-horn" tapered opening therethrough essentially concentrically located about and with respect to the center of said disc, with one taper side of said opening in a curve of decreasing radius with respect to said center and the other taper side of said opening on a curve of increasing radius with respect to said center, the axis of rotation of said disc being perpendicular thereto through said center and extending transversely of said compensation air gap generally in the direction from said second source to said second chamber and at one side of said compensation air gap whereby rotation of said disc presents different portions of said rams-horn opening as different size openings for the passage of different cross-section area uninterrupted streams of beta radiations from said second source to said second chamber to directly produce electrical effects of ionization of said gas in said second chamber, an electrical circuit arrangement including a pair of electrodes in each of said chambers whereby the electrical effects of ionization in said chambers are bucked against each other, a deviation indicator operable by departures from a null balance of said electrical effects, means for manually rotating said disc to change the said electrical effect in said second compensation chamber to compensate for changes in said electrical effect due to changes in the basis weight of said paper, and a mechanical counter device operable said manual means in representation of the degree of rotation of said disc and consequently in representation of said basis weight change.

References Cited in the file of this patent

UNITED STATES PATENTS

| | | |
|---|---|---|
| 2,467,812 | Clapp | Apr. 19, 1949 |
| 2,469,206 | Rich | May 3, 1949 |
| 2,488,269 | Clapp | Nov. 15, 1949 |
| 2,604,528 | Obermaier | July 22, 1952 |